United States Patent [19]

Badami et al.

[11] Patent Number: 5,284,523

[45] Date of Patent: Feb. 8, 1994

[54] FUZZY LOGIC CONTROL METHOD FOR REDUCING WATER CONSUMPTION IN A MACHINE FOR WASHING ARTICLES

[75] Inventors: Vivek V. Badami; Mark E. Dausch, both of Schenectady, N.Y.

[73] Assignee: General Electric Company, Schenectady, N.Y.

[21] Appl. No.: 877,301

[22] Filed: May 1, 1992

[51] Int. Cl.⁵ .............................................. B08B 7/04
[52] U.S. Cl. .................................... 134/18; 8/158; 68/12.05; 364/148
[58] Field of Search .................... 134/18; 8/158; 68/12.05; 364/148

[56] References Cited

U.S. PATENT DOCUMENTS

| | | | |
|---|---|---|---|
| 3,359,766 | 12/1967 | Haas | 68/207 |
| 3,478,373 | 11/1969 | McBride et al. | 8/158 |
| 3,508,287 | 4/1970 | Mason | 8/158 |
| 4,097,307 | 6/1978 | Geiger | 134/10 |
| 4,481,786 | 11/1984 | Bashark | 62/160 |
| 4,697,293 | 10/1987 | Knoop | 8/158 |
| 4,741,357 | 5/1988 | Battel et al. | 137/387 |
| 4,835,991 | 6/1989 | Knoop et al. | 68/12 R |
| 4,950,969 | 8/1990 | Getz | 318/740 |
| 5,161,110 | 11/1992 | Dorchak | 364/468 |

FOREIGN PATENT DOCUMENTS

| | | |
|---|---|---|
| 3803006A | 2/1988 | Fed. Rep. of Germany . |
| 2577778A | 2/1985 | France . |
| 0185298 | 8/1986 | Japan . |
| 0146579 | 6/1989 | Japan . |
| 2074291A | 3/1990 | Japan . |
| 2077296A | 3/1990 | Japan . |

Primary Examiner—Asok Pal
Assistant Examiner—P. Achutamurthy
Attorney, Agent, or Firm—Paul R. Webb, II

[57] ABSTRACT

A fuzzy logic based control method reduces the amount of water used by a washing machine or dishwasher during a cycle. A sensor detects when the washer has adequate water by monitoring the behavior of the washer pump motor as fresh water is coming in. There is a characteristic oscillation of the magnitude of the motor current as the pump cavitates during this operation, which diminishes when the washer is properly filled. By using fuzzy logic to sense this point of diminished or ceased cavitation and shutting off the incoming water, substantial savings of water can be achieved.

4 Claims, 1 Drawing Sheet

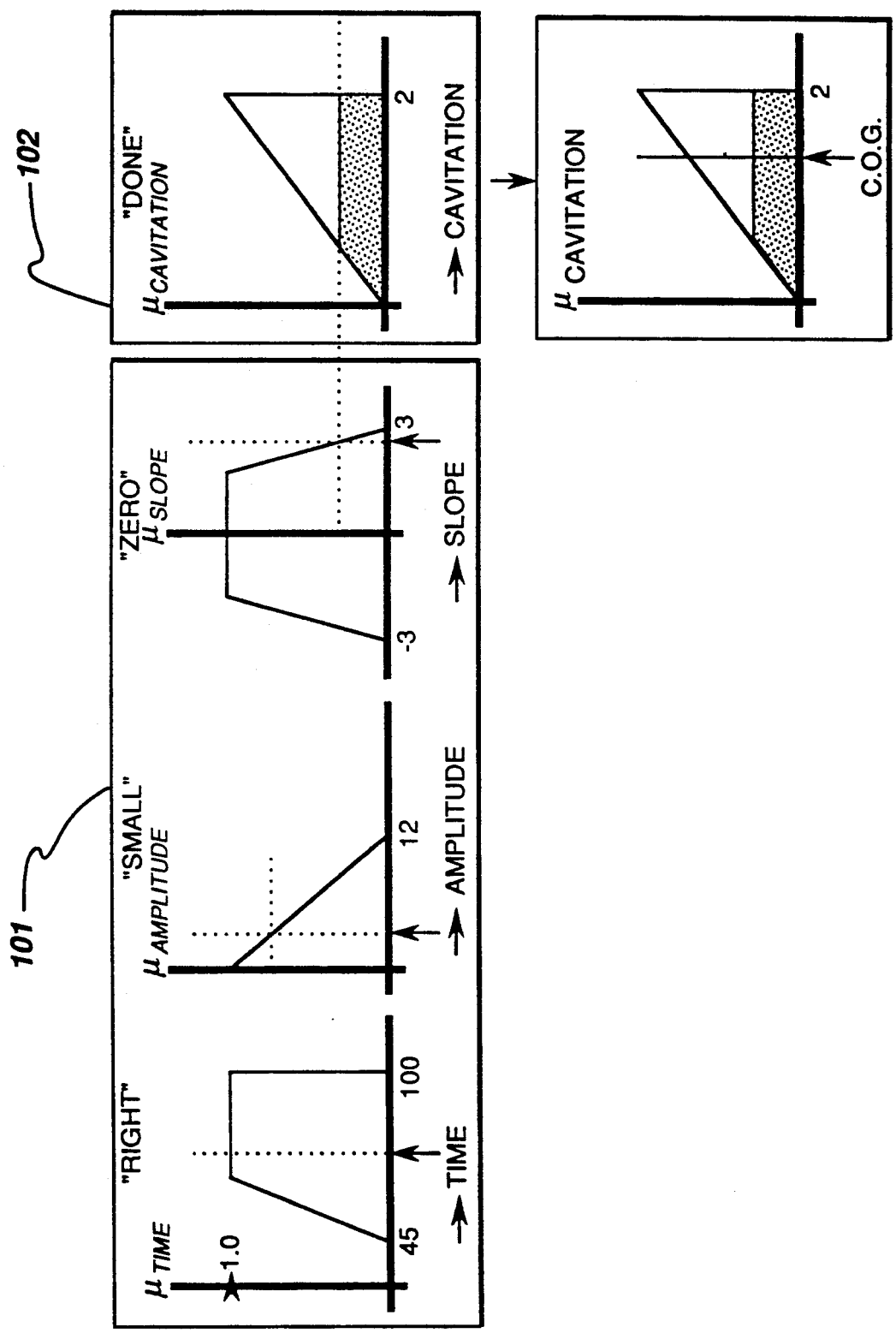

FUZZY LOGIC CONTROL METHOD FOR REDUCING WATER CONSUMPTION IN A MACHINE FOR WASHING ARTICLES

RELATED APPLICATIONS

This application is related to commonly assigned patent application Ser. No. 07/877,304, entitled "Fluid Handling Machine Incorporating a Closed Loop System for Controlling Machine Load" by Whipple, filed May 1, 1992 and patent application Ser. No. 07/877,30, entitled "Fluid Handling Machine for Incorporating a Closed Loop System for Controlling Liquid Load" by Dausch et al, filed May 1, 1992. The aforesaid applications are incorporated herein by reference.

BACKGROUND OF THE INVENTION

This invention relates to fuzzy logic control in general and more specifically to a method of using a fuzzy logic controller in a washing machine, dishwasher, or any other device for washing articles, to reduce the amount of water used in a wash cycle. As an example, most of the energy consumed by a dishwasher is in heating incoming water from the nominal home water supply temperature of 50° F. to the inlet temperature of 120° F. required by a dishwasher. Thus, reducing the amount of water used by a dishwasher during a cycle can be directly translated to energy savings. In current dishwashers the amount of time allowed for a fill (when the inlet valve is held open) is a predetermined fixed amount. The fill time is longer than required to ensure that there is enough water in the pump assembly to ensure a proper wash. Thus, some extra, and unnecessary water is admitted to provide a safety margin to compensate for variations in house water pressure and aging of system components. What is needed therefore is a method of sensing when the pump assembly has sufficient water to terminate the fill operation.

SUMMARY OF THE INVENTION

A method is provided for controlling a fill operation in a machine for washing articles. A fuzzy logic controller is used to determine when incoming water may be turned off by determining when the pump motor has stopped surging. By stopping the flow of water at this point, unnecessary water can be saved while assuring a sufficient volume of water for effective operation. The fuzzy logic controller utilizes a novel algorithm to determine the end of pump surging which uses fuzzy input variables for time, current amplitude and current amplitude slope. In terms of the fuzzy linguistic variables, time, amplitude, and slope, the fuzzy rule for determining end of fill may be expressed as: "When the time is right, the amplitude is small and the slope is zero, then cavitation has diminished or ceased" and the incoming water can be turned off.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

The single FIGURE illustrates the fuzzy inference process of the present invention.

DETAILED DESCRIPTION OF THE INVENTION

FIG. 1 shows the fuzzy inference process. At 101, fuzzy membership functions are defined over time, amplitude, and slope. The functions define ranges over which the variable inputs will be fuzzified as right, small and zero, respectively. The fuzzy rule is "If TIME IS RIGHT, AMPLITUDE IS SMALL, AND SLOPE IS ZERO THEN CAVITATION IS DONE". This rule returns a value, when it is executed, which corresponds to the degree to which all three antecedents "time", "amplitude", and "slope" are satisfied by the scalar input values corresponding to the fuzzy variables. The value returned in the variable "cavitation" is the minimum of the degrees of fulfillment of the three antecedent fuzzy variables. The control algorithm can use an arbitrary threshold, such as 0.5, on the values of "cavitation" to decide when to close the inlet valve. Those skilled in the art will realize that there are many design choices which can be made in the implementation of fuzzy logic and the present invention is not limited to any of these including exact termset shapes, degree-of-matching rules, and defuzzification methods. The novelty of the present invention is in the use of signals which can be used to represent the status of pump motor surge and particularly in the use of fuzzy logic to know when the motor has stopped surging by determining when the signal amplitude is small (however defined), the slope of the amplitude is zero (however defined), and the time is right (sufficient time has elapsed).

As described in patent application Ser. No. 07/877,304, a fuzzy logic controller may be used to control the amount of water to be provided to a machine for washing articles. As also described in the aforesaid patent application, one may determine when the machine has sufficient water by sensing the end of oscillations or surges in the power consumption of the motor. Several methods for sensing when the motor has ceased to surge or "cavitate", as it is sometimes referred to, are by measuring pump motor current, pump motor current/voltage phase angle difference, motor speed, power and water pressure. The present inventive method is not dependent on the particular sensing method used. What is important is that some such signal is available for determining when the pump motor has ceased to surge. In particular the present invention is a method for using the features of this signal, including the amplitude of oscillation and slope of the average signal to determine the end of motor surge. A third variable, time, is also used to ensure that the water is not shut off prematurely due to system noise very early in the fill operation. The present invention is therefore a fuzzy logic rule for determining if cavitation is done.

Appendix A contains a listing of "TIL" (using the Togai Infralogic (TM) fuzzy logic development system) file which can be compiled into C-code or assembly code for use in a target processor to practice the present invention.

The use of fuzzy logic provides advantages over conventional "boolean" logic in that control decisions can be made when precise ranges for controller inputs are not known. Using fuzzy ranges for variables allows a gradual transition between ON and OFF status of the controller output as well as a gradual transition between multiple control rules. An additional advantage is improved performance at a lower cost.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

---
APPENDIX "A"
---

```
/* TIL file for the dishwasher */
PROJECT cavitation_stop
VAR amplitude
    TYPE signed word
    MIN 0
    MAX 50
    MEMBER small
        POINTS 0 1 12 1 15 0
    END
END /* of amplitude */
VAR slope
    TYPE signed word
    MIN -10
    MAX 10
    MEMBER zero
        POINTS -3 0 -2 1 2 1 3 0
    END
END /* of slope */
VAR time
    TYPE signed word
    MIN 0
    MAX 100
    MEMBER right
        POINTS 45 0 50 1 100 1
    END
END /* OF TIME */
VAR cavitation
    TYPE word
    MIN 0
    MAX 2
    MEMBER done
        POINTS 0 0 1 1 2 0
    END
END /* of cavitation */
/* knowledge base */
FUZZY dish_rules
    RULE Rule1
        IF time IS right AND amplitude IS small AND slope IS
        zero THEN cavitation IS done
    END
END /* of knowledge base */
/* connects */
CONNECT
    FROM time
    TO dish_rules
END
CONNECT
    FROM amplitude
    TO dish_rules
END
```

---
-continued

APPENDIX "A"
---

```
CONNECT
    FROM slope
    TO dish_rules
END
CONNECT
    FROM dish_rules
    TO cavitation
END
END /* of project */
```

What is claimed is:

1. A method for reducing water consumption in a machine for washing articles, said machine including a pump, said method comprising the steps of:

determining, using fuzzy logic, when said pump has stopped surging during a fill operation by calculating a fuzzy time, a fuzzy current oscillation amplitude and a fuzzy slope of average current; and terminating said fill operation when said pump has stopped surging.

2. A method for reducing water consumption in a machine for washing articles, said machine including a pump, said method comprising the steps of:

determining, using fuzzy logic, when said pump has stopped surging during a fill operation by calculating a fuzzy time, a fuzzy voltage/current phase angle difference oscillation amplitude and a fuzzy slope of average voltage/current phase angle difference; and terminating said fill operation when said pump has stopped surging.

3. A method for reducing water consumption in a machine for washing articles, said machine including a pump, said method comprising the steps of:

determining, suing fuzzy logic, when said pump has stopped surging during a fill operation by calculating a fuzzy time, a fuzzy motor speed oscillation amplitude and a fuzzy slope of average motor speed; and terminating said fill operation when said pump has stopped surging.

4. A method for reducing water consumption in a machine for washing articles, said machine including a pump, said method comprising the steps of:

determining, using fuzzy logic, when said pump has stopped surging during a fill operation by calculating a fuzzy time, a fuzzy motor power oscillation amplitude and a fuzzy slope of average motor power; and terminating said fill operation when said pump has stopped surging.

* * * * *